US012574714B2

(12) United States Patent
Park et al.

(10) Patent No.: US 12,574,714 B2
(45) Date of Patent: Mar. 10, 2026

(54) ACCESS CONTROL FOR PUBLIC WARNING SYSTEM MESSAGES ON A NON-PUBLIC NETWORK

(71) Applicant: SHARP KABUSHIKI KAISHA, Sakai City (JP)

(72) Inventors: Kenneth James Park, Vancouver, WA (US); Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 361 days.

(21) Appl. No.: 18/028,199

(22) PCT Filed: Sep. 22, 2021

(86) PCT No.: PCT/JP2021/034692
§ 371 (c)(1),
(2) Date: Mar. 23, 2023

(87) PCT Pub. No.: WO2022/065332
PCT Pub. Date: Mar. 31, 2022

(65) Prior Publication Data
US 2023/0362612 A1      Nov. 9, 2023

Related U.S. Application Data

(60) Provisional application No. 63/082,559, filed on Sep. 24, 2020.

(51) Int. Cl.
*H04W 4/90*          (2018.01)
*H04W 4/06*          (2009.01)
(Continued)

(52) U.S. Cl.
CPC ............... *H04W 4/90* (2018.02); *H04W 4/06* (2013.01); *H04W 48/02* (2013.01); *H04W 48/16* (2013.01)

(58) Field of Classification Search
CPC ......... H04W 4/90; H04W 4/06; H04W 48/02; H04W 48/16
See application file for complete search history.

(56) References Cited

U.S. PATENT DOCUMENTS

2010/0255838 A1    10/2010  Wu
2014/0301344 A1 *  10/2014  Lee ................... H04W 74/0833
                                                            370/329
(Continued)

OTHER PUBLICATIONS

3GPP TS 38.331 V16.1.0 (Jul. 2020) 3rd Generation Partnership Project; Technical Specification Group Radio Access Network; NR; Radio Resource Control (RRC) protocol specification (Release 16).
(Continued)

*Primary Examiner* — Dai Phuong
(74) *Attorney, Agent, or Firm* — ScienBiziP, P.C.

(57)          ABSTRACT

A user equipment (UE) that includes reception circuitry configured to receive system information from a cell is provided. The system information includes: one or more network identifiers, each of which identifying a public land mobile network (PLMN) or a Non-Public Networks (NPN) and identifying cell status information. The UE also includes processing circuitry configured to determine whether the cell status information indicates that the cell is barred, or to be treated as barred, for the UE. In a case that a Public Warning System (PWS) broadcast service is supported by the cell, the UE is allowed to camp on the cell for receiving one or more PWS messages, even if the cell status information indicates that the cell is barred, or to be treated as barred, for the UE.

7 Claims, 2 Drawing Sheets

200

Transmit system information to one or more UEs, the system information comprising (1) one or more network identifiers, each of the one or more network identifiers identifying a PLMN or an NPN, and (2) cell status information ~202

Broadcast one or more PWS messages in the cell, where non-NPN UEs and NPN-UEs, which would otherwise not be allowed to camp on the cell, may camp on the cell for the purpose of receiving the one or more PWS messages when no other suitable or acceptable cells are available for these UEs ~204

(51) Int. Cl.
    *H04W 48/02*     (2009.01)
    *H04W 48/16*     (2009.01)

(56)                    References Cited

U.S. PATENT DOCUMENTS

| 2019/0313232 | A1* | 10/2019 | Lee | H04W 4/90 |
| 2021/0044408 | A1* | 2/2021 | Kubota | H04W 72/23 |
| 2022/0046403 | A1* | 2/2022 | He | H04W 4/12 |
| 2023/0180227 | A1* | 6/2023 | Jia | H04W 36/00 |
| | | | | 370/329 |

OTHER PUBLICATIONS

3GPP TS 22.268 V16.3.0 (Jun. 2019) 3rd Generation Partnership Project; Technical Specification Group Services and System Aspects; Public Warning System (PWS) requirements (Release 16).

3GPP TS 38.304 V16.1.0 (Jul. 2020) 3rd Generation Partnership Project; Technical Specification Group Radio Access Network; NR; User Equipment (UE) procedures in Idle mode and RRC Inactive state (Release 16).
3GPP TS 38.331 V16.0.0 (Mar. 2020) 3rd Generation Partnership Project; Technical Specification Group Radio Access Network; NR; Radio Resource Control (RRC) protocol specification (Release 16).
3GPP TS 38.300 V16.1.0 (Mar. 2020) 3rd Generation Partnership Project; Technical Specification Group Radio Access Network; NR; NR and NG-RAN Overall Description; Stage 2 (Release 16).
Intel Corporation, "Notification of System Information Update", R2-1805016, 3GPP TSG-RAN WG2 NR meeting #101 bis Sanya, China, Apr. 16-Apr. 20, 2018.
LG Electronics, "CMAS ETWS for NPN", S1-203049, 3GPP TSG-SA WG Meeting #91-e Electronic Meeting, Aug. 24-28, 2020.
LG Electronics, "CMAS ETWS for NPN", S1-203049, 3GPP TSG-SA WG Meetig #91-e, Electronic Meeting, Aug. 24, 2020-Aug. 28, 2020, Aug. 13, 2020 [retrieved on Aug. 13, 2020].

* cited by examiner

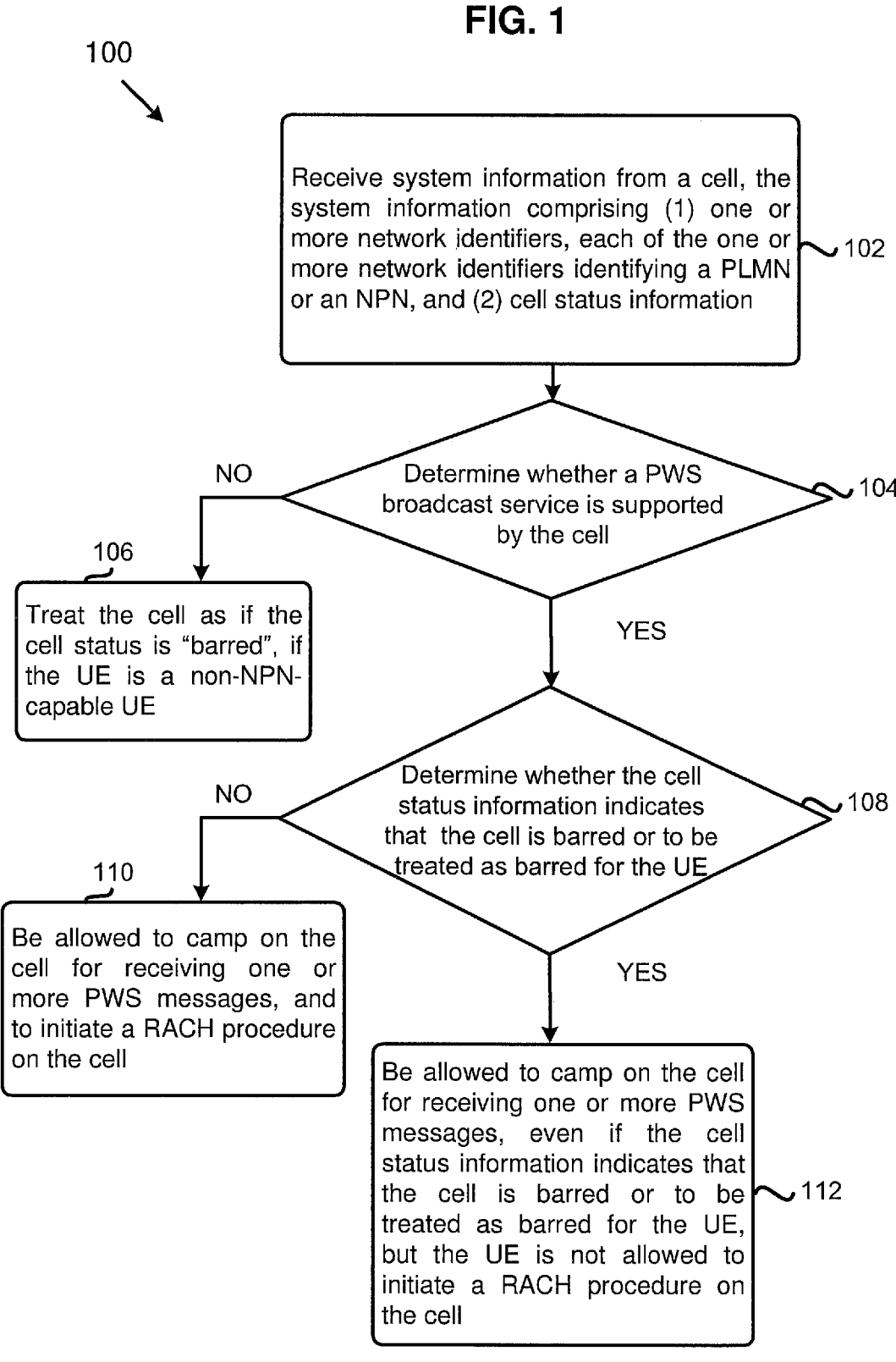

Receive system information from a cell, the system information comprising (1) one or more network identifiers, each of the one or more network identifiers identifying a PLMN or an NPN, and (2) cell status information ～102

Determine whether a PWS broadcast service is supported by the cell ～104

NO

106

Treat the cell as if the cell status is "barred", if the UE is a non-NPN-capable UE

YES

Determine whether the cell status information indicates that the cell is barred or to be treated as barred for the UE ～108

NO

110

Be allowed to camp on the cell for receiving one or more PWS messages, and to initiate a RACH procedure on the cell

YES

Be allowed to camp on the cell for receiving one or more PWS messages, even if the cell status information indicates that the cell is barred or to be treated as barred for the UE, but the UE is not allowed to initiate a RACH procedure on the cell ～112

Figure 2:
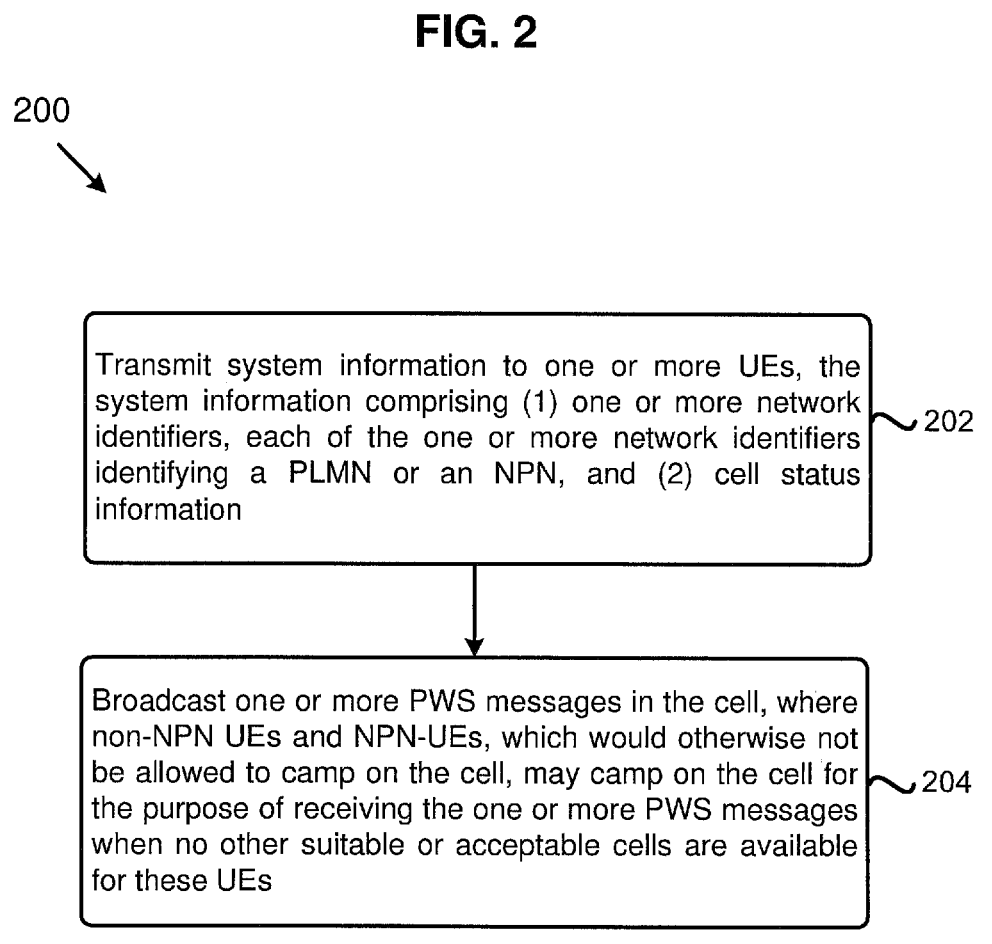

Transmit system information to one or more UEs, the system information comprising (1) one or more network identifiers, each of the one or more network identifiers identifying a PLMN or an NPN, and (2) cell status information ~202

Broadcast one or more PWS messages in the cell, where non-NPN UEs and NPN-UEs, which would otherwise not be allowed to camp on the cell, may camp on the cell for the purpose of receiving the one or more PWS messages when no other suitable or acceptable cells are available for these UEs ~204

ACCESS CONTROL FOR PUBLIC WARNING SYSTEM MESSAGES ON A NON-PUBLIC NETWORK

TECHNICAL FIELD

The present disclosure generally relates to wireless communications, more specifically, relates to access control for Public Warning System (PWS) messages on a Non-Public Network (NPN).

BACKGROUND ART

The 3rd Generation Partnership Project (3GPP) support the PWS. The PWS is used to alert the public to events such as disasters. For instance, when earthquakes, tsunamis, hurricanes, or wildfires occur, the PWS can be used to notify the general public population to evacuate impacted areas within a certain time. In addition, the PWS can be used to notify people of a Child Abduction Emergency (e.g., AMBER alert). PWS notifications should be delivered accurately and in a timely manner to the public in order to help people adequately prepare for events.

Different countries may have different requirements on delivery of warning messages. Thus, the 3GPP networks provide different warning systems for different countries. However, warning systems supported by 3GPP use a common system architecture and common signaling procedures. As listed in Table-1 below, 3GPP standardized different warning systems in different releases, according to requests from corresponding countries,

TABLE 1

Public Warning Systems supported by 3GPP.

| Warning System | Target Region | Release |
| --- | --- | --- |
| ETWS | Japan | Release 8 |
| CMAS | United States of America | Release 9 |
| KPAS | South Korea | Release 10 |
| EU-ALERT | European countries | Release 11 |

The 3GPP PWSs were first specified in Release 8, allowing for direct warnings to be sent to mobile users on conventional User Equipment (PWS-UE), capable of displaying a text-based and language-dependent Warning Notification. Since that time, there has been a growth in the number of mobile devices with little or no user interface—including wrist bands, sensors and cameras—many of which are not able to display warning notifications.

Additional Release-16 requirements for an enhanced Public Warning System (ePWS) have been agreed at the recent 3GPP TSG SA #79 meeting, as an update to Technical Specification (TS) 22.268.

NR Radio Access Network (RAN) connected to 5GC provides support for PWSs by means of system information broadcasting. NR RAN is responsible for scheduling and broadcasting of the warning messages. NR RAN is also responsible for paging the UE to provide indication that the warning message is being broadcasted. Earthquake and Tsunami Warning System (ETWS) is a public warning system developed to meet the regulatory requirements for warning notifications related to earthquake and/or tsunami events. Commercial Mobile Alert System (CMAS) is a public warning system developed for the delivery of multiple, concurrent warning notifications. A notification message, such as a Short Message transmitted over Downlink Control Information (DCI) or a Paging message, is used to inform UEs about ETWS and CMAS indications, which may be received by the UE while in RRC_IDLE and RRC_INACTIVE and RRC_CONNECTED.

The notification message indicating ETWS/CMAS notification triggers acquisition of system information (without delaying until the next modification period). Different SIBs are defined for ETWS primary notification, ETWS secondary notification and CMAS notification. For example, SIB6 provides ETWS primary notification. SIB7 provides ETWS secondary notification. SIB8 provides CMAS warning notification.

Currently, there is no 3GPP service and feature requirements (SA1) service requirements related to the support of PWS by NPNs. However, supporting PWS by NPNs would be beneficial to the general public.

Thus, there is a need in the art for access control for PWS messages on an NPN.

SUMMARY OF INVENTION

In one example, a user equipment (UE), comprising: reception circuitry configured to receive system information from a cell, the system information comprising: (1) one or more network identifiers, each of the one or more network identifiers identifying a public land mobile networks (PLMN) or a Non-Public Networks (NPN); and (2) cell status information; processing circuitry configured to determine whether the cell status information indicates that the cell is barred or to be treated as barred for the UE; wherein, in a case that a Public Warning System (PWS) broadcast service is supported by the cell, the UE is allowed to camp on the cell for receiving one or more PWS messages, even if the cell status information indicates that the cell is barred or to be treated as barred for the UE.

In one example, a method performed by a user equipment (UE), the method comprising: receiving system information from a cell, the system information comprising: (1) one or more network identifiers, each of the one or more network identifiers identifying a public land mobile networks (PLMN) or a Non-Public Networks (NPN); and (2) cell status information; determining whether the cell status information indicates that the cell is barred or to be treated as barred for the UE; wherein, in a case that a Public Warning System (PWS) broadcast service is supported by the cell, the UE is allowed to camp on the cell for receiving one or more PWS messages, even if the cell status information indicates that the cell is barred or to be treated as barred for the UE.

In one example, a base station apparatus, comprising: transmission circuitry configured to transmit system information to a user equipment (UE), the system information comprising: (1) one or more network identifiers, each of the one or more network identifiers identifying a public land mobile networks (PLMN) or a Non-Public Networks (NPN); and (2) cell status information; wherein, in a case that a Public Warning System (PWS) broadcast service is supported by the cell, the UE is allowed to camp on the cell for receiving one or more PWS messages, even if the cell status information indicates that the cell is barred or to be treated as barred for the UE.

BRIEF DESCRIPTION OF DRAWINGS

Implementations of the present technology will now be described, by way of example only, with reference to the attached figures.

FIG. 1 is a flowchart of a method by a UE for receiving PWS messages on an NPN, in accordance with an example implementation of the present disclosure.

FIG. 2 is a flowchart of a method by a base station for transmitting PWS messages on an NPN, in accordance with an example implementation of the present disclosure.

DESCRIPTION OF EMBODIMENTS

The present disclosure relates to methods and apparatuses for access control for PWS messages on an NPN.

According to a first aspect of the present disclosure, a user equipment (UE) comprises reception circuitry configured to receive system information from a cell, the system information comprising (1) one or more network identifiers, each of the one or more network identifiers identifying a public land mobile networks (PLMN) or a Non-Public Networks (NPN); and (2) cell status information. The UE further comprises processing circuitry configured to determine whether the cell status information indicates that the cell is barred or to be treated as barred for the UE. In a case that a Public Warning System (PWS) broadcast service is supported by the cell, the UE is allowed to camp on the cell for receiving one or more PWS messages, even if the cell status information indicates that the cell is barred or to be treated as barred for the UE.

In one implementation of the first aspect, the PWS broadcast service is supported by the cell, in a case that at least one of the one or more network identifiers identifies a PLMN.

In another implementation of the first aspect, the PWS broadcast service is supported by the cell, in a case that the system information includes a PWS-Support information element (IE).

In yet another implementation of the first aspect, the PWS-Support IE is included in a system information block 1 (SIB1).

In yet another implementation of the first aspect, if the PWS-Support IE is absent from the system information and all of the one or more network identifiers identify NPNs, the PWS broadcast service is not supported in the cell.

In yet another implementation of the first aspect, while the UE is allowed to camp on the cell for receiving the one or more PWS messages in the case that the PWS broadcast service is supported in the cell and the cell status information indicates that the cell is barred or to be treated as barred for the UE, the UE is not allowed to initiate a random access (RACH) procedure on the cell.

According to a second aspect of the present disclosure, a method performed by a user equipment (UE) comprises receiving system information from a cell, the system information comprising (1) one or more network identifiers, each of the one or more network identifiers identifying a public land mobile networks (PLMN) or a Non-Public Networks (NPN); and (2) cell status information. The method further comprises determining whether the cell status information indicates that the cell is barred or to be treated as barred for the UE. In a case that a Public Warning System (PWS) broadcast service is supported by the cell, the UE is allowed to camp on the cell for receiving one or more PWS messages, even if the cell status information indicates that the cell is barred or to be treated as barred for the UE.

In one implementation of the second aspect, the PWS broadcast service is supported by the cell, in a case that at least one of the one or more network identifiers identifies a PLMN.

In another implementation of the second aspect, the PWS broadcast service is supported by the cell, in a case that the system information includes a PWS-Support information element (IE).

In yet another implementation of the second aspect, the PWS-Support IE is included in a system information block 1 (SIB1).

In yet another implementation of the second aspect, if the PWS-Support IE is absent from the system information and all of the one or more network identifiers identify NPNs, the PWS broadcast service is not supported in the cell.

In yet another implementation of the second aspect, while the UE is allowed to camp on the cell for receiving the one or more PWS messages in the case that the PWS broadcast service is supported in the cell and the cell status information indicates that the cell is barred or to be treated as barred for the UE, the UE is not allowed to initiate a random access (RACH) procedure on the cell.

According to a third aspect of the present disclosure, a base station apparatus comprises transmission circuitry configured to transmit system information to a user equipment (UE), the system information comprising (1) one or more network identifiers, each of the one or more network identifiers identifying a public land mobile networks (PLMN) or a Non-Public Networks (NPN); and (2) cell status information. In a case that a Public Warning System (PWS) broadcast service is supported by the cell, the UE is allowed to camp on the cell for receiving one or more PWS messages, even if the cell status information indicates that the cell is barred or to be treated as barred for the UE.

In one implementation of the third aspect, the PWS broadcast service is supported by the cell, in a case that at least one of the one or more network identifiers identifies a PLMN.

In another implementation of the third aspect, the PWS broadcast service is supported by the cell, in a case that the system information includes a PWS-Support information element (IE).

In yet another implementation of the third aspect, the PWS-Support IE is included in a system information block 1 (SIB1).

In yet another implementation of the third aspect, if the PWS-Support IE is absent from the system information and all of the one or more network identifiers identify NPNs, the PWS broadcast service is not supported in the cell.

In yet another implementation of the third aspect, while the UE is allowed to camp on the cell for receiving the one or more PWS messages in the case that the PWS broadcast service is supported in the cell and the cell status information indicates that the cell is barred or to be treated as barred for the UE, the cell prevents the UE from initiating a random access (RACH) procedure on the cell.

According to a fourth aspect of the present disclosure, a method performed by a base station apparatus comprises transmitting system information to a user equipment (UE), the system information comprising (1) one or more network identifiers, each of the one or more network identifiers identifying a public land mobile networks (PLMN) or a Non-Public Networks (NPN); and (2) cell status information. In a case that a Public Warning System (PWS) broadcast service is supported by the cell, the UE is allowed to camp on the cell for receiving one or more PWS messages, even if the cell status information indicates that the cell is barred or to be treated as barred for the UE.

In one implementation of the fourth aspect, the PWS broadcast service is supported by the cell, in a case that at least one of the one or more network identifiers identifies a PLMN.

In another implementation of the fourth aspect, the PWS broadcast service is supported by the cell, in a case that the system information includes a PWS-Support information element (IE).

In yet another implementation of the fourth aspect, the PWS-Support IE is included in a system information block 1 (SIB1).

In yet another implementation of the fourth aspect, if the PWS-Support IE is absent from the system information and all of the one or more network identifiers identify NPNs, the PWS broadcast service is not supported in the cell.

In yet another implementation of the fourth aspect, while the UE is allowed to camp on the cell for receiving the one or more PWS messages in the case that the PWS broadcast service is supported in the cell and the cell status information indicates that the cell is barred or to be treated as barred for the UE, the cell prevents the UE from initiating a random access (RACH) procedure on the cell.

The 3GPP is a collaboration agreement that aims to define globally applicable technical specifications and technical reports for third and fourth generation wireless communication systems. The 3GPP may define specifications for next generation mobile networks, systems and devices.

3GPP LTE is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc.

In the 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and EUTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5G communication systems, dubbed NR technologies by the 3GPP, envision the use of time/frequency/space resources to allow for services, such as eMBB transmission, URLLC transmission, and massive Machine Type Communication (mMTC) transmission. Also, in NR, single-beam and/or multi-beam operations is considered for downlink and/or uplink transmissions.

Various examples of the systems and methods disclosed herein are now described with reference to the figures, where like reference numbers may indicate functionally similar elements. The systems and methods as generally described and illustrated in the Figures herein could be arranged and designed in a wide variety of different implementations. Therefore, the detailed description of the present disclosure as illustrated in the figures is not intended to limit scope of the present disclosure but is merely representative of the systems and methods.

An NPN enables deployment of the next generation (e.g., $5^{th}$ Generation (5G) New Radio (NR)) wireless communication system for private use. An NPN may be deployed as a Stand-alone Non-Public Network (SNPN) or a Public network integrated NPN (PNI-NPN). An SNPN is operated by an NPN operator and not relying on network functions provided by a public land mobile network (PLMN).

An SNPN is identified by a combination of a PLMN ID and a Network identifier (NID). An SNPN-enabled UE is configured with a SUbscription Permanent Identifier (SUPI) and credentials for each subscribed SNPN identified by the combination of the PLMN ID and NID. An SNPN Radio Access Network (RAN) broadcasts the PLMN ID and NID in the System Broadcast enabling network (re-)selection, overload control, access control and barring are supported using the PLMN ID and NID. In addition, the 3rd Generation Partnership Project (3GPP) Release-16 specifies the ability for a UE to obtain PLMN services while camping on an SNPN RAN, for example, when the UE has a subscription and credentials to obtain services from both the PLMN and SNPN.

A PNI-NPN is an NPN deployed with the support of a PLMN. In the case of a PNI-NPN, a PLMN ID identifies the network, a Closed Access Group (CAG) ID identifies one or more CAG cells. A CAG cell broadcasts one or multiple CAG Identifiers per PLMN. Network selection and reselection is based on the PLMN ID. Cell selection and reselection and access control are based on the CAG ID. The CAG cell broadcasts information such that only UEs supporting CAG may access the cell.

System Information (SI) in NR consists of a Master Information Block (MIB) and a number of System Information Blocks (SIBs), which are divided into Minimum SI and Other SI. Minimum SI carries basic information required for initial access and for acquiring any other SI. Minimum SI consists of MIB and SIB1. For a UE to be allowed to camp on a cell, it must have acquired the contents of the Minimum SI from that cell. Other SI consists of all SIBs not broadcast in the Minimum SI. The UE does not need to receive these SIBs before accessing the cell.

The content and scheduling of the minimum SI of MIB and SIB1 are as indicated below.

MIB provides for subframe number (SFN), critical information for the reception of SIB1 (Sub-Carrier Spacing (SCS), Subcarrier offset, Demodulation Reference Signal (DRMS) position, Physical Downlink Control Channel (PDCCH) configuration), Cell barred flag, Intra frequency reselection allowed flag. The MIB is mapped on to a Broadcast Control Channel (BCCH) logical channel and is carried on a Broadcast Channel (BCH) transport channel. The BCH is then mapped on to a Physical Broadcast Channel (PBCH).

MIB is transmitted with a periodicity of 80 ms and is repeated (according to synchronization signal block (SSB) periodicity) within the 80 ms. MIB contents are same over 80 ms period and the same MIB is transmitted over all SSBs within the synchronization signal (SS) burst set. The MIB provides the UE with parameters (e.g. control resource set #0 (CORESET #0) configuration) required to acquire SIB1, more specifically, information required for monitoring of a PDCCH for scheduling a Physical Downlink Shared Channel (PDSCH) that carries SIB1.

SIB1 provides for Cell selection information, PLMN list, Cell ID, tracking area code, RAN area code, cell reserved flag, connection establishment failure control information, SI scheduling info, serving cell's common uplink and downlink configuration (random access channel (RACH), paging etc.), supplementary uplink (SUL) configuration, SSB scheduling information, cell-specific time division duplex (TDD) uplink (UL)/downlink (DL) configuration, Cell's IP MultiMedia Subsystem (IMS) emergency bearer support flag (for UE's in limited service), emergency call over IMS support flag, UE's timers and constants, Access control information, etc.

SIB1 carries the most critical information required for the UE to access the cell (e.g., random access parameters). SIB1 includes information regarding the availability and scheduling of other SIBs (e.g., mapping of SIBs to SI message, periodicity, SI-window size, etc.). SIB1 also indicates whether one or more SIBs are only provided on-demand, in which case, it may also provide physical random access channel (PRACH) configuration needed by the UE to request for the required SI. SIB1 is transmitted on a DL-SCH (logical channel: BCCH) with a periodicity of 160 ms and variable transmission repetition periodicity within 160 ms. SIB1 is a cell-specific SIB.

The UE acquires SI upon cell selection (e.g. upon power on), cell-reselection, return from out of coverage, after reconfiguration with sync completion, after entering the network from another radio access technology (RAT), upon receiving an indication that the SI has changed, upon receiving a PWS notification and whenever the UE does not have a valid version of a stored SIB.

When the network starts, or changes, a PWS broadcast (e.g., SIB6/SIB7/SIB8), it notifies the UEs about this change using Short Message transmitted with Paging Radio Network Temporary Identifier (P-RNTI) over Downlink Control Information (DCI). DCI format 1_0 scrambled with P-RNTI. Upon receiving this message, the UE immediately re-acquires SIB1 and based on scheduling information, the UE acquires SIB6/SIB7/SIB8.

According to implementations of the present disclosure, a UE with a subscription to a PLMN or a non-public network may be required to be able to receive CMAS/ETWS messages. If the UE is not able to find any authorized (subscribed) PLMN or nonpublic network, the UE may be allowed to automatically select and camp on such an unauthorized network which supports CMAS/ETWS. In this case, the UE may process CMAS/ETWS messages if received, but may not be allowed to attach to the unauthorized network.

There are challenges for an NPN to provide PWS services.

One challenge for an NPN to provide PWS services is that the current 3GPP specification does not allow a non-NPN UE (or a non-authorized NPN UE) to camp on an NPN or SNPN cell if all PLMNs and NPNs of the cell are not allowed for the UE, even if there are no other available cells of other PLMNs/NPNs to receive CMAS/ETWS messages.

For example in the current 3GPP Technical Specification (TS) 38.304-g10, Section 5.3.1 states:

5.3.1 Cell Status and Cell Reservations

Cell status and cell reservations are indicated in the MIB or SIB1 message as specified in TS 38.331 [3] by means of following fields:

cellBarred (IE type: "barred" or "not barred")

Indicated in MIB message. In case of multiple PLMNs or NPNs indicated in SIB1, this field is common for all PLMNs and NPNs cellReservedForOperatorUse (IE type: "reserved" or "not reserved") Indicated in SIB1 message. In case of multiple PLMNs or NPNs indicated in SIB1, this field is specified per PLMN or per SNPN.

cellReservedForOtherUse (IE type: "true") Indicated in SIB1 message. In case of multiple PLMNs indicated in SIB1, this field is common for all PLMNs.

cellReservedForFutureUse (IE type: "true") Indicated in SIB1 message. In case of multiple PLMNs or NPNs indicated in SIB1, this field is common for all PLMNs and NPNs.

NOTE: IAB-MT ignores the cellBarred, cellReservedFor-OperatorUse, cellReservedForFutureUse, cellReservedForOtherUse and intraFreqReselection (i.e. treats intraFreqReselection as if it was set to allowed) as defined in TS 38.331 [3]. IAB-MT also ignores cellReservedForOtherUse for cell barring determination (i.e. NPN capable IAB-MT considers cellReservedForOtherUse for determination of an NPN-only cell) as defined in TS 38.331 [3].

iab-Support (IE type: "true")

Indicated in SIB1 message. In case of multiple PLMNs or NPNs indicated in SIB1, this field is specified per PLMN or per SNPN.

As can be seen above, when the cell status is indicated as "not barred" and "not reserved" for operator use and not "true" for other use and not "true" for future use, then "All UEs shall treat this cell as candidate during the cell selection and cell reselection procedures".

When the cell broadcasts any CAG IDs or NIDs and the cell status is indicated as "not barred" and "not reserved" for operator use and "true" for other use, and not "true" for future use, "[a]ll NPN-capable UEs shall treat this cell as candidate during the cell selection and cell reselection procedures", but "other UEs shall treat this cell as if cell status is 'barred'". That is the non-NPN-capable UEs is not allowed to camp on the cell even for the sole purpose of receiving PWS messages.

When the cell status is indicated as "true" for other use, and either cell does not broadcast any CAG-IDs or NIDs or does not broadcast any CAG-IDs and the UE is not operating in SNPN Access Mode, then "the UE shall treat this cell as if cell status is 'barred'".

When the cell status is indicated as "true" for future use, then "the UE shall treat this cell as if cell status is 'barred'".

When the cell status is indicated as "not barred" and "reserved" for operator use for any PLMN/SNPN and not "true" for other use and not "true" for future use, UEs assigned to Access Identity 11 or 15 operating in their HPLMN/EHPLMN shall treat this cell as candidate during the cell selection and reselection procedures if the field cellReservedForOperatorUse for that PLMN set to "reserved".

UEs assigned to Access Identity 11 or 15 shall treat this cell as candidate during the cell selection and reselection procedures if the field cellReservedForOperatorUse for selected/registered SNPN is set to "reserved".

UEs assigned to an Access Identity 0, 1, 2 and 12 to 14 shall behave as if the cell status is "barred" in case the cell is "reserved for operator use" for the registered PLMN/SNPN or the selected PLMN/SNPN.

NOTE 1: Access Identities 11, 15 are only valid for use in the HPLMN/EHPLMN; Access Identities 12, 13, 14 are only valid for use in the home country as specified in TS 22.261 [12].

When the cell status "barred" is indicated or to be treated as if the cell status is "barred":

The UE is not permitted to select/reselect this cell, not even for emergency calls.

The UE shall select another cell according to the following rule:

If the cell is to be treated as if the cell status is "barred" due to being unable to acquire the MIB:

the UE may exclude the barred cell as a candidate for cell selection/reselection for up to 300 seconds.

the UE may select another cell on the same frequency if the selection criteria are fulfilled.

else:

If the field intraFreqReselection in MIB message is set to "allowed", the UE may select another cell on the same frequency if re-selection criteria are fulfilled;

The UE shall exclude the barred cell as a candidate for cell selection/reselection for 300 seconds.

If the field intraFreqReselection in MIB message is set to "not allowed":

If the cell operates in licensed spectrum or if this cell belongs to a PLMN which is indicated as being equivalent to the registered PLMN or if this cell belongs to the registered SNPN of the UE:

the UE shall not re-select a cell on the same frequency as the barred cell;

else:

the UE may select to another cell on the same frequency if reselection criteria are fulfilled.

The UE shall exclude the barred cell and, if the cell operates in licensed spectrum or if this cell belongs to a PLMN which is indicated as being equivalent to the registered PLMN, also the cells on the same frequency as a candidate for cell selection/reselection for 300 seconds.

The cell selection of another cell may also include a change of RAT.

Another challenge for an NPN to provide PWS services is that the even if the behaviors enumerated in the above 3GPP specification are modified to allow a non-NPN UE to camp on an NPN or SNPN cell when no other cells are available, there is no indication to the UEs that an SNPN or NPN cell is capable of broadcasting a PWS message when one becomes available.

Implementations of the present disclosure allow a non-NPN UE (e.g., a nonNPN-capable UE)) to monitor for PWS messages on an SNPN or NPN cell that provide PWS services when no other suitable or acceptable cells are available. Also, an NPN-UE that is not authorized to camp on an SNPN or NPN cell is allowed to camp on that cell for the purpose of receiving PWS messages when no other suitable or acceptable cells are available.

According to an implementation of the present disclosure, a new indication is added to the SI broadcast by a cell, the new indication indicating that the cell is capable of broadcasting PWS messages. For example, this indication may be added into MIB and/or at least one SIB (e.g., SIB1), as a new IE. The new IE may be known as "PWS-Support". The PWS-Support IE may take on an enumerated value "true" to indicate that the cell is capable of broadcasting Public Warning Messages (PWS). The cell can be of an NPN cell or a non-NPN cell.

The following is an example implementation of the PWS-Support IE into SIB1.

```
SIB1 ::=          SEQUENCE {
    cellSelectionInfo                SEQUENCE {
        q-RxLevMin                       Q-RxLevMin,
```

-continued

```
    q-RxLevMinOffset                        INTEGER (1..8)
    q-RxLevMinSUL                           Q-RxLevMin
    q-QualMin                               Q-QualMin
    q-QualMinOffset                         INTEGER (1..8)
    }
    cellAccessRelatedInfo                   CellAccessRelatedInfo,
    connEstFailureControl                   ConnEstFailureControl
...text removed for brevity...
    useFullResumeID                         ENUMERATED {true}
    lateNonCriticalExtension                OCTET STRING
    nonCriticalExtension                    SIB1-v1610-IEs
}
SIB1-v1610-IEs ::=              SEQUENCE {
    idleModeMeasurementsEUTRA-r16           ENUMERATED{true}
    idleModeMeasurementsNR-r16              ENUMERATED{true}
    posSI-SchedulingInfo-r16                PosSI-SchedulingInfo-r16
    nonCriticalExtension                    SIB1-v17-IEs
}
SIB1-v17-IEs    ::=            SEQUENCE {
    PWS-Support                                          ENUMERATED{true}
OPTIONAL;
    nonCriticalExtension               SEQUENCE { }
}
UAC-AccessCategory1-SelectionAssistanceInfo ::=   ENUMERATED {a, b, c}
-- TAG-SIB1-STOP
-- ASN1STOP
```

In an example, if the PWS-Support IE is added to SIB1, the SIB1 field descriptions may include:

SIB1 field descriptions

```
cellSelectionInfo
Parameters for cell selection related to the serving cell.
. . . text removed for brevity . . .
PWS-Support
Indicates whether the cell supports PWS message broadcast service. If absent,
PWS message broadcast is not supported by the network in the NPN cell.
. . . text removed for brevity . . .
useFullResumeID
Indicates which resume identifier and Resume request message should be used. UE
uses fulll-RNTI and RRCResumeRequest1 if the field is present, or shortI-RNTI and
RRCResumeRequest if the field is absent.
```

According to another implementation of the present disclosure, a non-NPN UE is allowed to monitor for PWS messages on an SNPN or NPN cell that provide PWS services when no other suitable or acceptable cells are available. Also, an NPN-UE that is not authorized to camp on an SNPN or NPN cell is allowed to camp on that cell for the purpose of receiving PWS messages when no other suitable or acceptable cells are available.

In order to accomplish the above objective, the UE's cell selection or reselection behaviors in the current 3GPP specification need to be modified as follows:

5.3.1 Cell Status and Cell Reservations with:

[ . . . Existing text of 5.3.1 above removed for brevity . . . ]

When cell broadcasts any CAG IDs or NIDs and the cell status is indicated as "not barred" and "not reserved" for operator use and "true" for other use, and not "true" for future use:

All NPN-capable UEs shall treat this cell as candidate during the cell selection and cell reselection procedures.

If PWS-Support is set to "true", all non NPN-capable UEs shall treat this cell as if cell status is "acceptable cell" during the Any Cell Selection procedure, and shall not start any RACH procedure on this cell.

If PWS-Support is absent, all non NPN-capable UEs shall treat this cell as if cell status is "barred".

[ . . . Existing text of 5.3.1 below removed for brevity . . . ].

5.2.8 Camped on any Cell State with:

[ . . . Existing text of 5.2.8 above removed for brevity . . . ]

if the UE supports voice services and the current cell does not support IMS emergency calls as indicated by the field ims-EmergencySupport in SIB1 as specified in TS 38.331 [3], the UE shall perform cell selection/reselection to an acceptable cell that supports emergency calls in any supported RAT regardless of priorities provided in system information from current cell, if no suitable cell is found.

If PWS-Support is set to "true" and if the NPN UE supports PWS services and if the UE is unauthorized to camp on NPN/PLMN, the UE is allowed to camp on NPN/PLMN. However, such an NPN UE and shall not start any RACH procedure while camped on this cell. [ . . . Existing text of 5.2.8 below removed for brevity . . . ].

By combining the above implementations, a UE (either a non-NPN UE, or an NPN UE that is not authorized camp on the NPN/PLMN) that cannot find any other suitable cell may then camp on the non-suitable cell (until a suitable cell is found) which broadcasts a PWS-Support IE in SIB1 indicating that the NPN is capable of broadcasting PWS message, and the UE can receive a PWS message from that cell if the NPN should at some point broadcast the PWS message.

FIG. 1 is a flowchart of a method 100 by a UE for receiving PWS messages on an NPN, in accordance with an implementation of the present disclosure. As shown in FIG. 1, action 102 may include receiving system information from a cell, where the system information includes (1) one or more network identifiers, each of the one or more network identifiers identifying a PLMN or an NTN Non-Public Networks (NPN), and (2) cell status information.

In an example implementation of the present disclosure, the cell may broadcast one or more CAG IDs or NIDs in the system information.

In an example implementation of the present disclosure, the system information may include:

a cell status IE (e.g., cellBarred) indicating whether the cell is "barred" or "not barred";

a reserved for operator use IE (e.g., cellReservedForOperatorUse) indicating whether the cell is reserved for operator use;

a cell reserved for other use IE (e.g., cellReservedForOtherUse) indicating whether the cell is reserved for other use;

a cell reserved for future use IE (e.g., cellReservedForFutureUse) indicating whether the cell is reserved for future use.

In an example implementation of the present disclosure, the system information may also include an indication indicating whether a PWS broadcast service is supported by the cell. For example, a new IE (PWS-Support) is added into at least one of the MIB and one of the SIBs (e.g., SIB1). The PWS-Support IE may take on an enumerated value "true" to indicate that the cell is capable of broadcasting PWS messages. The cell may be either an NPN cell or a non-NPN cell. If the PWS-Support is absent in the system information, then it should be treated as the PWS broadcasting service is not supported by the network in the NPN cell.

As shown in FIG. 1, action 104 may include determining whether the PWS broadcast service is supported by the cell. For example, if the PWS-support is set to "true" in SIB1, then the PWS broadcast service is supported by the cell. If the PWS-support is absent, then the PWS broadcast service is not supported by the cell. In one example implementation, the cell may be an NPN cell.

In action 106, if the PWS broadcast service is not supported by the cell and if the UE is a non-NPN-capable UE (e.g., a normal UE subscribed to a PLMN, but not an NPN), then the UE shall treat the cell as if the cell status is "barred".

In action 108, when the PWS broadcast service is supported by the cell, the UE may determine whether the cell status information indicates that the cell is barred or to be treated as barred for the UE.

In action 110, in the case that the PWS broadcast service is supported by the cell and the cell status information indicates that the cell is not barred or to be treated as barred for the UE, the UE is allowed to camp on the cell for receiving one or more PWS messages, and is allowed to initiate a random access (RACH) procedure on the cell.

In action 112, in the case that the PWS broadcast service is supported by the cell, the UE is allowed to camp on the cell for receiving one or more PWS messages, even if the cell status information indicates that the cell is barred or to be treated as barred for the UE.

FIG. 2 is a flowchart of a method 200 by a base station for transmitting PWS messages on an NPN, in accordance with an example implementation of the present disclosure. As shown in FIG. 2, action 202 may include transmitting system information to one or more UEs, where the system information includes (1) one or more network identifiers, each of the one or more network identifiers identifying a PLMN or an NTN Non-Public Networks (NPN), and (2) cell status information.

In an example implementation of the present disclosure, the cell may broadcast one or more CAG IDs or NIDs in the system information.

In an example implementation of the present disclosure, the system information may include:

a cell status IE (e.g., cellBarred) indicating whether the cell is "barred" or "not barred";

a reserved for operator use IE (e.g., cellReservedForOperatorUse) indicating whether the cell is reserved for operator use;

a cell reserved for other use IE (e.g., cellReservedForOtherUse) indicating whether the cell is reserved for other use;

a cell reserved for future use IE (e.g., cellReservedForFutureUse) indicating whether the cell is reserved for future use.

In an example implementation of the present disclosure, the system information may also include an indication indicating whether a PWS broadcast service is supported by the cell. For example, a new IE (PWS-Support) is added into at least one of the MIB and one of the SIBs (e.g., SIB1). The PWS-Support IE may take on an enumerated value "true" to indicate that the cell is capable of broadcasting PWS messages. The cell may be either an NPN cell or a non-NPN cell. If the PWS-Support is absent in the system information, then it should be treated as the PWS broadcasting service is not supported by the network in the NPN cell.

As shown in FIG. 2, action 204 may include broadcasting one or more PWS messages, where non-NPN UEs and NPN-UEs that would otherwise not be allowed to camp on the cell may camp on the cell for the purpose of receiving the one or more PWS messages, when no other suitable or acceptable cells are available for these UEs. It should be noted that while the UE is allowed to camp on the cell for receiving the one or more PWS messages in the case that the PWS broadcast service is supported in the cell and the cell status information indicates that the cell is barred or to be treated as barred for the UE, the cell prevents the UE from initiating a random access (RACH) procedure on the cell. In other words, the UE is not allowed to initiate a RACH procedure on the cell.

From the present disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

SUMMARY

In one example, a user equipment (UE), comprising: reception circuitry configured to receive system information from a cell, the system information comprising: (1) one or more network identifiers, each of the one or more network identifiers identifying a public land mobile networks (PLMN) or a Non-Public Networks (NPN); and (2) cell status information; processing circuitry configured to determine whether the cell status information indicates that the cell is barred or to be treated as barred for the UE; wherein, in a case that a Public Warning System (PWS) broadcast service is supported by the cell, the UE is allowed to camp on the cell for receiving one or more PWS messages, even if the cell status information indicates that the cell is barred or to be treated as barred for the UE.

In one example, the UE, wherein the PWS broadcast service is supported by the cell, in a case that at least one of the one or more network identifiers identifies a PLMN.

In one example, the UE, wherein the PWS broadcast service is supported by the cell, in a case that the system information includes a PWS-Support information element (IE).

In one example, the UE, wherein the PWS-Support IE is included in a system information block 1 (SIB1).

In one example, the UE, wherein, if the PWS-Support IE is absent from the system information and all of the one or more network identifiers identify NPNs, the PWS broadcast service is not supported in the cell.

In one example, the UE, wherein, while the UE is allowed to camp on the cell for receiving the one or more PWS messages in the case that the PWS broadcast service is supported in the cell and the cell status information indicates that the cell is barred or to be treated as barred for the UE, the UE is not allowed to initiate a random access (RACH) procedure on the cell.

In one example, a method performed by a user equipment (UE), the method comprising: receiving system information from a cell, the system information comprising: (1) one or more network identifiers, each of the one or more network identifiers identifying a public land mobile networks (PLMN) or a Non-Public Networks (NPN); and (2) cell status information; determining whether the cell status information indicates that the cell is barred or to be treated as barred for the UE; wherein, in a case that a Public Warning System (PWS) broadcast service is supported by the cell, the UE is allowed to camp on the cell for receiving one or more PWS messages, even if the cell status information indicates that the cell is barred or to be treated as barred for the UE.

In one example, the method, wherein the PWS broadcast service is supported by the cell, in a case that at least one of the one or more network identifiers identifies a PLMN.

In one example, the method, wherein the PWS broadcast service is supported by the cell, in a case that the system information includes a PWS-Support information element (IE).

In one example, the method, wherein the PWS-Support IE is included in a system information block 1 (SIB1).

In one example, the method, wherein, if the PWS-Support IE is absent from the system information and all of the one or more network identifiers identify NPNs, the PWS broadcast service is not supported in the cell.

In one example, the method, wherein, while the UE is allowed to camp on the cell for receiving the one or more PWS messages in the case that the PWS broadcast service is supported in the cell and the cell status information indicates that the cell is barred or to be treated as barred for the UE, the UE is not allowed to initiate a random access (RACH) procedure on the cell.

In one example, a base station apparatus, comprising: transmission circuitry configured to transmit system information to a user equipment (UE), the system information comprising: (1) one or more network identifiers, each of the one or more network identifiers identifying a public land mobile networks (PLMN) or a Non-Public Networks (NPN); and (2) cell status information; wherein, in a case that a Public Warning System (PWS) broadcast service is supported by the cell, the UE is allowed to camp on the cell for receiving one or more PWS messages, even if the cell status information indicates that the cell is barred or to be treated as barred for the UE.

In one example, the base station apparatus, wherein the PWS broadcast service is supported by the cell, in a case that at least one of the one or more network identifiers identifies a PLMN.

In one example, the base station apparatus, wherein the PWS broadcast service is supported by the cell, in a case that the system information includes a PWS-Support information element (IE).

In one example, the base station apparatus, wherein the PWS-Support IE is included in a system information block 1 (SIB1).

In one example, the base station apparatus, wherein, if the PWS-Support IE is absent from the system information and all of the one or more network identifiers identify NPNs, the PWS broadcast service is not supported in the cell.

In one example, the base station apparatus, wherein, while the UE is allowed to camp on the cell for receiving the one or more PWS messages in the case that the PWS broadcast service is supported in the cell and the cell status information indicates that the cell is barred or to be treated as barred for the UE, the cell prevents the UE from initiating a random access (RACH) procedure on the cell.

In one example, a method performed by a base station apparatus, the method comprising: transmitting system information to a user equipment (UE), the system information comprising: (1) one or more network identifiers, each of the one or more network identifiers identifying a public land mobile networks (PLMN) or a Non-Public Networks (NPN); and (2) cell status information; wherein, in a case that a Public Warning System (PWS) broadcast service is supported by the cell, the UE is allowed to camp on the cell for receiving one or more PWS messages, even if the cell status information indicates that the cell is barred or to be treated as barred for the UE.

In one example, the method, wherein the PWS broadcast service is supported by the cell, in a case that at least one of the one or more network identifiers identifies a PLMN.

In one example, the method, wherein the PWS broadcast service is supported by the cell, in a case that the system information includes a PWS-Support information element (IE).

In one example, the method, wherein the PWS-Support IE is included in a system information block 1 (SIB1).

In one example, the method, wherein, if the PWS-Support IE is absent from the system information and all of the one or more network identifiers identify NPNs, the PWS broadcast service is not supported in the cell.

In one example, the method, wherein, while the UE is allowed to camp on the cell for receiving the one or more PWS messages in the case that the PWS broadcast service is supported in the cell and the cell status information indicates that the cell is barred or to be treated as barred for the UE, the cell prevents the UE from initiating a random access (RACH) procedure on the cell.

CROSS REFERENCE

This Nonprovisional application claims priority under 35 U.S.C. § 119 on provisional Application No. 63/082,559 on Sep. 24, 2020, the entire contents of which are hereby incorporated by reference.

What is claimed is:

1. A user equipment (UE), comprising:

reception circuitry configured to receive system information from a cell, the system information comprising:

one or more network identifiers, each of the one or more network identifiers identifying a public land mobile network (PLMN) or a Non-Public Networks (NPN); and cell status information; and processing circuitry configured to determine whether the cell status information indicates that the cell is barred, or to be treated as barred, for the UE, wherein a Public Warning System (PWS) broadcast service is supported by the cell in a case that the system information includes a PWS-Support information element (IE), and in a case that the PWS-Support IE is absent from the system information and all of the one or more network identifiers identify the NPN, the PWS broadcast service is not supported in the cell.

2. The UE of claim 1, wherein the PWS-Support IE is included in a system information block 1 (SIB1).

3. The UE of claim 1, wherein, while the UE is allowed to camp on the cell for receiving one or more PWS messages in the case that the PWS broadcast service is supported in the cell and the cell status information indicates that the cell is barred, or to be treated as barred, for the UE, the UE is not allowed to initiate a random access (RA) procedure on the cell.

4. A method performed by a user equipment (UE), the method comprising:

receiving system information from a cell, the system information comprising:

one or more network identifiers, each of the one or more network identifiers identifying a public land mobile network (PLMN) or a Non-Public Network (NPN); and cell status information; and determining whether the cell status information indicates that the cell is barred, or to be treated as barred, for the UE, wherein a Public Warning System (PWS) broadcast service is supported by the cell in a case that the system information includes a PWS-Support information element (IE), and in a case that the PWS-Support IE is absent from the system information and all of the one or more network identifiers identify the NPN, the PWS broadcast service is not supported in the cell.

5. A base station apparatus, comprising:

transmission circuitry configured to transmit system information to a user equipment (UE), the system information comprising:

one or more network identifiers, each of the one or more network identifiers identifying a public land mobile network (PLMN) or a Non-Public Network (NPN); and cell status information, wherein transmission of the system information causes the UE to determine whether the cell status information indicates that a cell is barred, or to be treated as barred, for the UE, a Public Warning System (PWS) broadcast service is supported by the cell in a case that the system information includes a PWS-Support information element (IE), and in a case that the PWS-Support IE is absent from the system information and all of the one or more network identifiers identify the NPN, the PWS broadcast service is not supported in the cell.

6. The base station apparatus of claim 5, wherein the PWS-Support IE is included in a system information block 1 (SIB1).

7. The base station apparatus of claim 5, wherein, while the UE is allowed to camp on the cell for receiving one or more PWS messages in the case that the PWS broadcast service is supported in the cell and the cell status information indicates that the cell is barred, or to be treated as barred, for the UE, the cell prevents the UE from initiating a random access (RA) procedure on the cell.

* * * * *